United States Patent [19]

Laupman

[11] 3,746,919

[45] July 17, 1973

[54] CONTROL DEVICE FOR LUMINESCENT LAMPS

[75] Inventor: Robert Ronald Laupman, Wijchen, Netherlands

[73] Assignee: Novanex Automation N.V., Wijchen, Netherlands

[22] Filed: Apr. 16, 1971

[21] Appl. No.: 134,590

[30] Foreign Application Priority Data
Apr. 17, 1970 Netherlands.................... 7005575

[52] U.S. Cl.................................. 315/105, 315/105
[51] Int. Cl. ........................................... H05b 39/00
[58] Field of Search ................................... 315/105

[56] References Cited
UNITED STATES PATENTS 3,482,142  12/1969  Cluett et al......................... 315/105
3,479,560  11/1969  Paget et al.......................... 315/105
3,479,559  11/1969  Paget................................. 315/105

Primary Examiner—Nathan Kaufman
Attorney—Diller, Brown, Ramik & Holt

[57] ABSTRACT

A light output control device which includes a controllable bidirectional semiconductor which with its mains current path is connected across the two filaments of a luminescent lamp. The firing moment of the semiconductor can be selectively set, so that the average lamp current in each half cycle of the a.c. voltage across the lamp can be controlled. During the intervals in which the semi-conductor is fired, a compensation current is flowing through the lamp filaments, by which proper ignition of the lamp during each half cycle of power source a.c. voltage is ensured.

8 Claims, 8 Drawing Figures

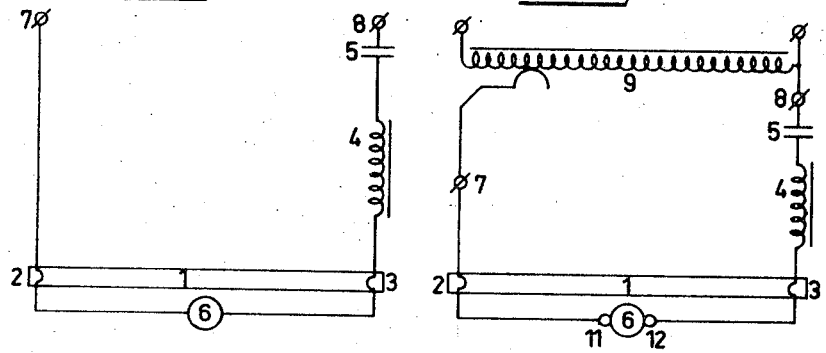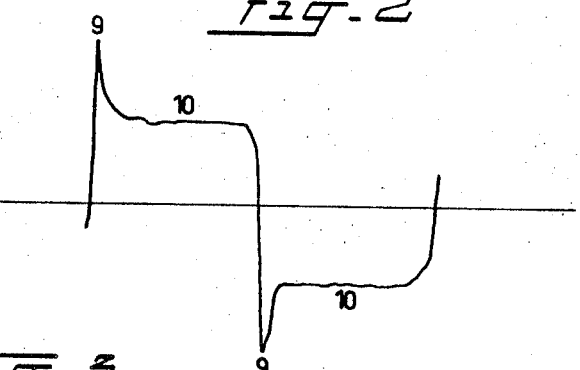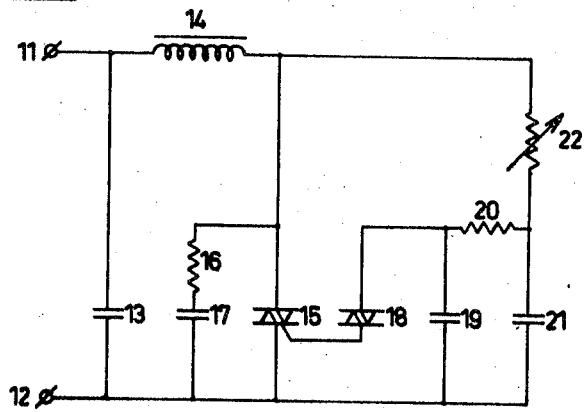

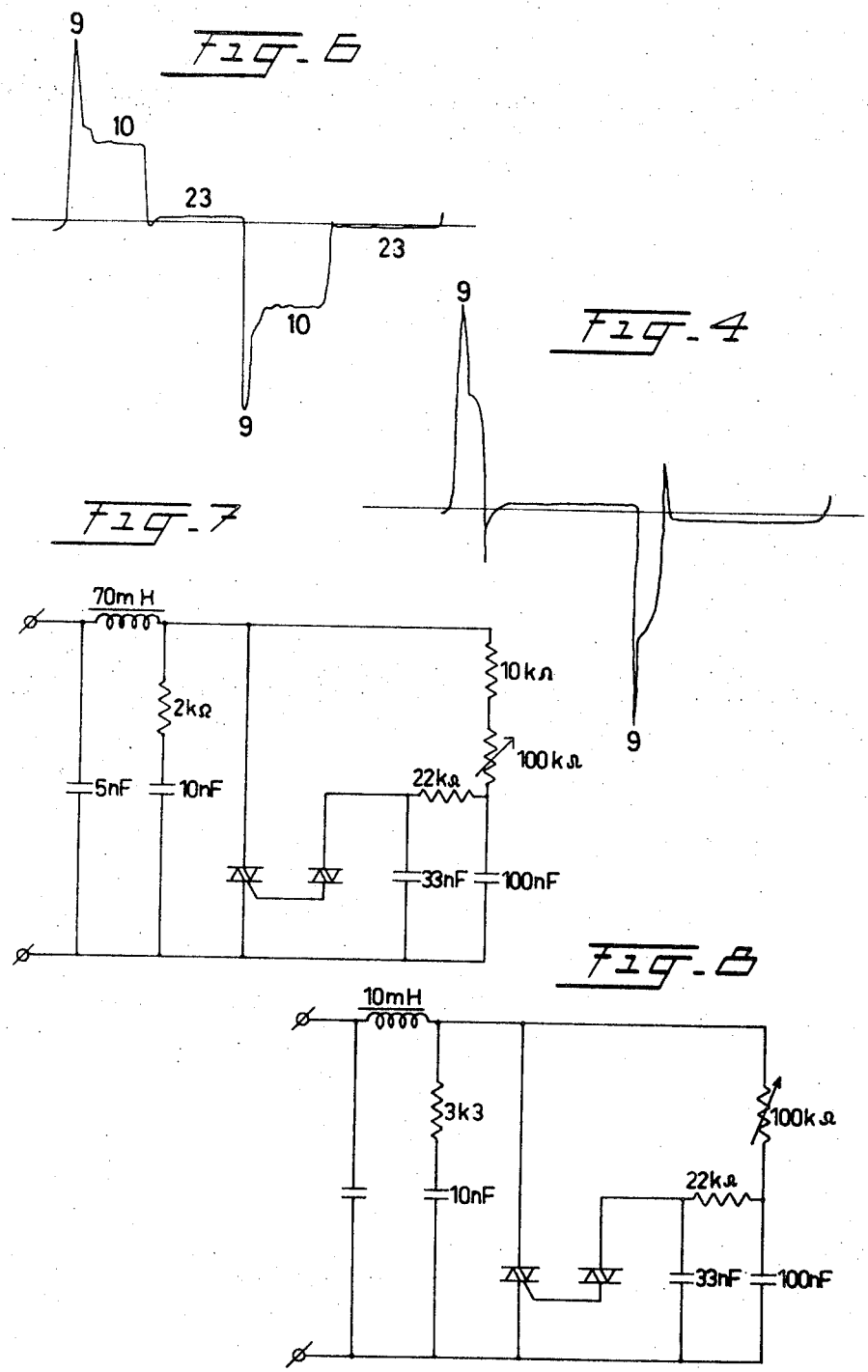

CONTROL DEVICE FOR LUMINESCENT LAMPS

This invention relates to a device for controlling and-/or starting luminescent lamps.

A known circuit diagram for a lighting arrangement including a luminescent lamp capable of being started and operated from a normal low-voltage a.c. power source, is shown in FIG. 1.

In such an arrangement, a luminescent lamp 1, which is provided with cathode filaments 2 and 3, is series-connected with a choke-coil 4 for limiting the operating current and connectable to terminals 7/8 of, for example, 220 V a.c. voltage. For starting the lamp, a starter 6 is connected between the remaining terminals of the filaments.

The above arrangement presents an inductive load to the a.c. power source; it is also possible to use an arrangement which behaves as a capacitive load for the a.c. power source, and compensates the former arrangement. This can be effected by additionally including a capacitor 5 in series with choke-coil 4.

The lamp is started by just switching on the arrangement. The starter 6 will then as a rule short-circuit the lamp for some time, in full or in part, so that the full current which choke-coil 4 is capable of passing flows through the filaments. These are then heated, and when the voltage is subsequently released by starter 6, supply sufficient emission to light the tube, provided a sufficiently high ignition voltage appears across the tube. The construction of coil 4 and series capacitor 5, if there is one, is such that when starter 6 breaks the short-circuit path, this ignition voltage does appear across the tube.

When the lamp has been ignited, the waveform of the voltage between filaments 2 and 3, is quite specific for this kind of lamps, and is shown in FIG. 2. The ignition pulse 9 appears in each half cycle, whereafter the lamp is ignited, the voltage decreases to the operating voltage value 10, and, irrespective of the operating current, remains substantially constant.

Owing to the fact that the filaments alternately function as cathode and anode, these are maintained in heated condition, they being strongly heated as anode. This heating is essential, since the filaments are coated with an emission enhancing material, which is damaged when their operating temperature is too low.

This heating is also caused by the fact that the operating current of the tube is partially passed through the filaments, which after the starting process are substantially floating at one end.

For optimal operating conditions, the lamp, its filaments, the coil and the capacitor, if any are entirely adapted to each other.

Owing to the narrow tolerances permitted by the operating conditions described above, efforts of controlling such luminescent lamps have hitherto only partially succeeded.

It is known to provide filaments 2 and 3 continuously with operating current through separated windings of a filament current transformer. This, however, results in the filaments being unduly heated when the lamp is operating at its full capacity, so that special constructions of the electrodes are required. Moreover, in order to maintain a sufficiently high ignition pulse when the lamp is set for a reduced light output, it is necessary to use auxiliary equipment for generating these voltage peaks repetatively across the lamp, since a normal coil will generally no longer be capable to provide sufficient pulses. For if the (sinusoidal) a.c. voltage across the arrangement is decreased, for example, by means of a control transformer, the current at the end of the horizontal portion 10, in FIG. 2, will during the operating period be so low that the subsequent voltage peak 9 will hardly, if at all, be higher than the operating voltage 10. The lamp will then begin to operate in an unstable manner, and will fail entirely when the supply voltage is decreased to a further extent. In the case of a tube for a nominal voltage of 220 V, this happens already at a voltage as high as 120 V. When the filaments are allowed to operate at a fixed filament voltage, the voltage can be reduced only slightly further by means of a control transformer without the ignition pulses becoming intolerably low. Special auxiliary equipment can then be included to increase the pulses, so that low operating voltages become possible.

It is an object of the present invention to eliminate the drawbacks outlined above, and to provide a device by means of which luminescent lamps can be controlled in three different ways with the simplest possible construction, namely: (1) so that the light output of lamps can be controlled individually; (2) so that the light output of groups of such lamps can be controlled from a central point; and (3) so that the light output of groups of individually pre-set lamps is subject to centrally superimposed control.

It is a further object of the invention to provide an electronic control device which in modular form can be used as an electronic starter for standard luminescent lamp arrangements. For this last-mentioned purpose, electronic devices are known in the art, which, however, do not satisfy the requirements which according to the present invention are to be imposed upon a starter for controllable luminescent lamp arrangements.

The invention is based upon the following concept.

If it is desired for a luminescent lamp to be adjusted to reduced light intensity, this can be effected by causing a lower average current to flow through the lamp, for example, by extinguishing the lamp during a portion of each a.c. voltage half-cycle across the lamp, and if so desired additionally reducing the operating current during the operating period. In that case, however, the following conditions should be satisfied:

1. the temperature of the electrodes should be maintained approximately equal to that existing in the condition when the lamp is operating at its full capacity;

2. the ignition pulse at the beginning of each discharge in the case of shorter operating intervals should be equal to, but preferably higher than, that during the condition when the lamp is operating at its full capacity.

According to the invention, these conditions are satisfied in a surprisingly simple manner by connecting an electronic current control device in place of the original starter, in parallel to the tube, but in series with the filaments, which device after each desired operating period 10 of the lamp, short-circuits the lamp during each a.c. voltage half-cycle across the lamp, and thereby causes a compensation current to flow through the filaments during the period when the lamp is artificially extinguished in this manner 23.

According to the invention this arrangement also leads to the surprising effect that when the short-circuit condition of the tube is eliminated, the coil will generate the desired high ignition pulse across the tube when the lamp has been adjusted for reduced output. This increase of the ignition pulse is so high that, according to the invention, moreover the average current through the lamp can be reduced by reducing the mains voltage of the overall arrangement, so that as a result of the two measures, sufficient compensation current flows through the filaments during the artificial extinction of the lamp, whereas the ignition pulse at the beginning of each operating half-cycle remains substantially equally high as that during the full-capacity condition.

According to the invention, the control device should preferably be capable of functioning as a starter for the lamp when the combination is switched on, so that it should also meet the demands to be made on a starter:

Immediately after the arrangement has been switched on, the control starter according to the invention should cause a high-current to flow through the filaments by largely short-circuiting the lamp, whereafter ignition pulses of sufficient amplitude should be generated in the coil to start the lamp (voltage curve of FIG. 4).

When the lamp has been ignited, the control starter will have to shift the firing moment to a later instant of time and to such an extent that the pre-set operating period of the lamp becomes possible during each a.c. voltage half-cycle across the lamp, so that the filament current is reduced to the above-described desired compensation current (see the voltage curve of FIG. 6).

In an embodiment as illustrated in FIG. 3, such a control starter according to the invention has been realized in a simple manner.

Such a control starter comprises a capacitor 13, necessary for suppressing radio interference, connected between terminals 11 and 12. Connected in parallel therewith is a series-circuit constituted by a choke coil 14 and a triac 15. Connected in parallel with the triac is an ignition circuit and an RC circuit for appropriately firing the triac. The ignition circuit comprises resistors 20 and 22 and capacitors 19 and 21, while diac 18 provides the ignition pulse at the gate of triac 15.

The invention offers two possibilities of controlling the lamp: In the first place, the lamp can be controlled individually as follows: By changing the values of one of the components 22, 21, 20 or 19, the ignition moment can be advanced. The control starter will then be effective to cut the voltage wave form during each half-cycle and short-circuit the lamp voltage for a short period. The result is a voltage wave form as shown in FIG. 6. Here again we find ignition peak 9, followed by operating voltage 10, whereafter the triac fires and the voltage in period 23 is reduced practically to zero. The surprising effect which then occurs is that, owing to the fact that the coil is actually short-circuited further than during the operating period 10, a higher ignition pulse will appear across the lamp after the voltage has been reversed. And this is the very thing which is required, since the temperature of the tube tends to decrease when its operating period is reduced, which renders it more difficult to ignite. Owing to the shorter operating period, the electrode will no longer be warmed up in the normal manner either. In this case, however, the reduced warming-up is compensated for owing to the fact that during short-circuit period 23 the triac again draws filament current through the filaments. The resulting filament current heating is slightly higher than that which would occur during normal operation of the lamp during the comparable period. Consequently, the ultimate filament temperature becomes slightly higher than normally, which results in smooth and highly uniform operation of the tube, even in the case of a very short operating period (low light level).

When voltage is applied while the control starter has been set for a low output, the starting-voltage wave form of FIG. 4 will first appear across the tube until the lamp starts operating, whereafter the operating voltage wave form of FIG. 6 will gradually be established. Accordingly, the light output of the lamp increases gradually up to the level set.

In the second place, the lamp can be controlled, according to the invention, by varying the a.c. power source voltage, for example, by means of a control transformer, if the same control starter is used. The latter is then set at such a permanent value that at the nominal power source voltage of the apparatus, the voltage wave form is just not cut by the control device. When the ignition circuit arrangement is properly dimensioned, the following surprising effect occurs according to the invention. When the power source voltage of the overall arrangement is reduced, the control starter will begin to cut the voltage wave form. As the power source voltage is further reduced, the firing moment will be advanced more and more. If, in that arrangement, the lamp voltage at full capacity has the wave form of FIG. 2, the voltage wave form with a "turned low" control transformer will be very similar to that as shown in FIG. 6. The ignition peak 9, however, is lower, so that the ignition of the lamp in the "turned low" condition becomes more difficult. The surprising effect of the advanced ignition is based on the fact that the lamp voltage increases when the lamp current decreases. This effect can be explained as follows:

First, the voltage across the tube increases as soon as the current through the tube decreases. As a consequence, the ignition device will just start igniting. Owing to the resulting firing of the triac, the power source voltage of the ignition device will be eliminated, and the ignition system will be going to lead still further.

Second, the further short-circuiting of the coil will cause the ignition peak resulting from self-induction to increase. However, this functions at the same time as a supply voltage for the ignition circuit. This will therefore contribute towards continuation of the advancement, in spite of the reduction of the supply voltage of the overall system.

The advancement ultimately arrives at a maximum, with which the minimum working voltage of the system is practically reached as well. Below that the tube may be extinguished.

It will be clear that a third possibility is the combination of the above two main possibilities.

The great advantage of remote control by means of the control transformer is that it enables a two-wire connection of the arrangement. When the filaments are to be supplied with current separately, this supply requires the application of an additional line.

Owing to the combined functioning of the control starter, a further possibility offered is to use the starter as an electronic substitute for the traditional starter, with the additional characteristic that any desired burning level can be obtained as the final effect, either with a fixed or a variable setting. The setting may also be switchable rather than controllable.

The dissipation in the control starter is so slight that it may be built-in the standard housing of a traditional starter.

If it is desired to build the arrangement on the basis of standard equipment in the field of luminescent lamps, then it is preferable to use the capacitive embodiment, that is, including series capacitor 5, as the starting point. This construction has the following advantages.

As a rule, the ignition pulse is higher when the series capacitor is used. This makes the application of the control starter directly possible with the permissible mains voltage variations of + or − 10 percent.

Moreover, in the "turned low" condition, the arrangement behaves as a more neutral mains load.

Besides there is the risk of failure of the switch element. If this changes the switch element into a diode, the separation capacitor will be charged and thereafter no substantial current will flow any longer. The coils are resistant to complete short-circulating of the switch element.

For standard inductive systems, the voltage can be increased by transformation, but then it will be necessary to provide safety against unduly high current.

FIG. 7 shows a more detailed example of a control starter arranged for manual operation. By adjustment of the variable resistor of 100 K, the light output can be controlled at will. FIG. 8 shows a more detailed example of a control starter arranged for remote control, for example, by variation of the power source voltage.

I claim:

1. An electrical circuit for use in combination with an ionized arc discharge illuminating device, said device including power terminals for connection to a supply of alternating voltage less than a selected arc-starting level, a pair of electrodes between which the arc may be drawn during successive half cycles of the supply voltage, and inductive means for kicking the supply voltage above a high voltage arc-starting level and for limiting the current of the arc, said electrical circuit comprising:

bilateral semiconductor means connected across said electrodes, said bilateral semiconductor means having a gate electrode for switching the semiconductor means between a non-conductive state during which ignition pulses exceeding said high voltage are applied from said inductive means to said electrodes of the illuminating device and a conductive state during which heating current is allowed to flow through said electrodes of the illuminating device; and timing circuit means connected across said filaments in parallel with said bilateral semiconductor means and to said gate electrode thereof for controlling the state of said bilateral semiconductor means.

2. An electrical circuit as defined in claim 1 wherein said timing circuit means includes an adjustable element whereby the illumination intensity of said illuminating device may be varied.

3. An electrical circuit as defined in claim 1 including means for varying said supply voltage whereby the illumination intensity of said illuminating device may be varied.

4. A starter and illumination intensity control circuit for ionized arc discharge illuminating devices of the type having a pair of electrodes between which the arc is drawn, power terminals for connection to a supply of alternating voltage less than a selected arc-starting level, and inductive means for kicking the supply voltage above a high voltage arc-starting level and for limiting the current of the arc, said control circuit comprising:

bilateral semiconductor means connected across said electrodes, said bilateral semiconductor means having a gate electrode for switching the semiconductor means between a non-conductive state during which ignition pulses exceeding said high voltage are applied from said inductive means to said electrodes of the illuminating device and a conductive state during which heating current is allowed to flow through said electrodes of the illuminating device; and timing circuit means connected across said filaments in parallel with said bilateral semiconductor means and to said gate electrode thereof for controlling the state of said bilateral semiconductor means.

5. A control circuit for ionized arc discharge illuminating devices comprising, in combination:

a pair of power terminals for connection to a supply of alternating voltage less than a selected arc-starting level;

ballast means and gate-controlled bilateral semiconductor means connected in series across said power terminals; and timing circuit means connected in parallel with said bilateral semiconductor means for switching the latter between non-conductive and conductive states.

6. A control circuit as defined in claim 5 wherein said timing circuit means includes an adjustable element for varying the time constant of such timing circuit means.

7. A control circuit as defined in claim 6 including means for varying the supply voltage.

8. A control circuit as defined in claim 5 including means for varying the supply voltage.

* * * * *